Feb. 25, 1964  T. M. ROSENBLATT ETAL  3,122,495
START-UP PROCESS FOR COMBINED HYDROFORMING-HYDROFINING OPERATION
Filed Aug. 31, 1959
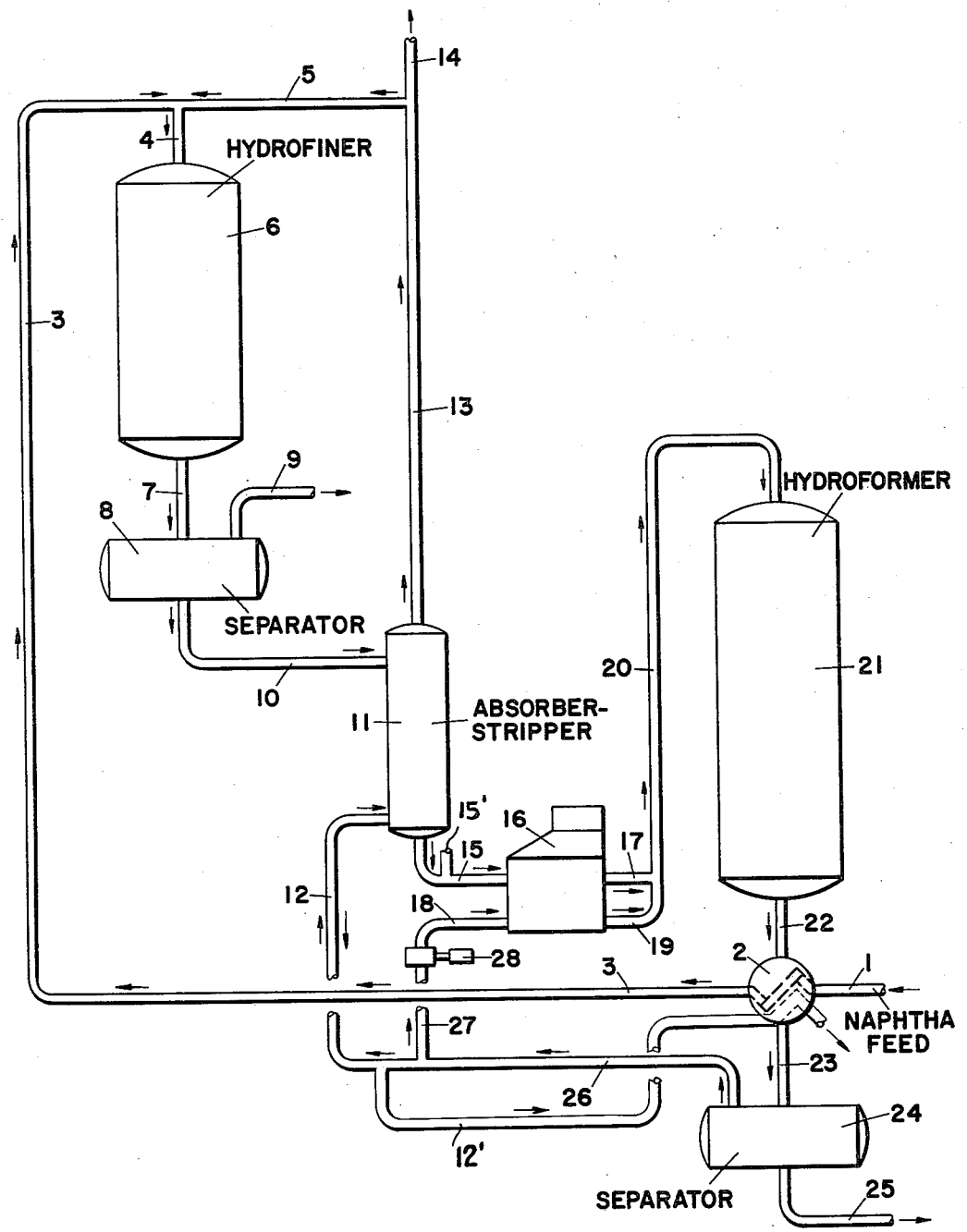
Theodore M. Rosenblatt
John Sosnowski                Inventors
By  H. M. Feyrer              Attorney 3,122,495
START-UP PROCESS FOR COMBINED HYDRO-
FORMING-HYDROFINING OPERATION
Theodore M. Rosenblatt, Elizabeth, and John Sosnowski, Westfield, N.J., assignors to Esso Research and Engineering Company, a corporation of Delaware
Filed Aug. 31, 1959, Ser. No. 837,127
6 Claims. (Cl. 208—97)

This invention relates to a reforming process and particularly to a process for hydroforming naphthas in contact with platinum on alumina catalysts. More specifically, this invention pertains to an integrated process for hydrofining a naphtha feed to lower or control its sulfur content and hydroforming the same in contact with a platinum on alumina catalyst.

Hydroforming naphtha feeds in contact with platinum alumina catalysts is a well known and widely used process for increasing the octane number and generally improving the engine performance characteristics of the finished gasoline product. In view of the sensitivity of said catalysts to sulfur or sulfur compounds in the feed, it is ordinarily necessary to pretreat the feed to reduce the sulfur content to below about 40 parts per million. This is usually accomplished by subjecting the feed stock to hydrofining or treatment with hydrogen in the presence of a hydrodesulfurizing catalyst to convert sulfur compounds to hydrogen sulfide which is then stripped from the naphtha feed stock before charging the same to the hydroforming reactor.

A variety of catalysts have been proposed for such hydrofining including molybdenum oxide, nickel-tungsten sulfide and most frequently, cobalt molybdate or mixtures of cobalt oxide and molybdenum oxide dispersed upon a support or carrier such as alumina. In general, such catalysts are prepared by first forming adsorptive alumina particles in any suitable way and then compositing molybdenum oxide and cobalt oxide therewith. The molybdenum oxide can be added as a slurry or it may be applied as a solution of ammonium molybdate. The cobalt oxide is conveniently added as a salt such as cobalt nitrate or acetate, salts which are readily decomposed to cobalt oxide and volatile materials. The cobalt oxide and molybdenum oxide may be provided in equimolar amounts or a molecular excess of one over the other may be used. Suitable catalysts contain from about 5 to about 25 wt. percent of cobalt oxide and molybdenum oxide with the ratio of the former to the latter in the range of from about one to five to about five to one.

The hydrofining of naphtha feed stocks is ordinarily effected by contacting the naphtha fraction with the aforesaid catalysts at temperatures of about 500 to 700° F. and pressures of about 50 to 500 p.s.i.g. The naphtha feed rate is about 0.1 to about 20, preferably about 4–5 volumes per volume of catalyst in the reactor per hour. Hydrogen or hydrogen-rich gas (containing at least about 65–70 volume per cent hydrogen) is also passed through the hydrofining reaction zone at a rate of from about 30 to 3000 s.c.f./bbl. of feed. Under these conditions some hydrogen is consumed in the process. Hydrogen consumption rates are generally in the range of from about 1 to 20 s.c.f./bbl. of feed but may be as high as 150–600 s.c.f./bbl.

In the hydrofining process the sulfur compounds are largely converted to hydrogen sulfide which is thereupon stripped from the hydrofined material by condensing the same and separating the normally gaseous materials and then subjecting the condensate to distillation preferably combined with stripping with hydrogen containing gas which is thereupon used as the treat gas in the hydrofining step. The stripped naphtha should have a sulfur content of less than 40 parts per million and preferably should contain less than 10 parts per million of sulfur in order to be suitable for charging to the platinum hydroforming reaction zone. The hydrofining and stripping step will ordinarily also lower the nitrogen content of the hydrofined naphtha to below about 1 p.p.m. By supplying the hydrofined naphtha to the upper part of the stripping section of an absorber stripper which is maintained at about 175–200° F. it is further possible to lower the water content of the naptha to below 10 parts per million. This is also advantageous in the subsequent step of hydroforming in contact with a platinum on alumina catalyst.

The hydroforming of the hydrofined naphtha feed is effected by contacting vaporized naphtha feed in admixture with hydrogen with a catalyst containing a platinum group metal dispersed or supported upon an alumina carrier. The preferred metal is platinum and is provided in amounts of from about 0.05 to 2.0 wt. percent, preferably about 0.3–0.6 wt. percent. Palladium on the other hand is ordinarily provided in somewhat greater amounts i.e. 0.5 to 5.0 wt. percent. These catalysts are normally prepared by impregnating activated or adsorptive alumina with an aqueous solution of the platinum group metal compound, for example, chloroplatinic acid, platinum chloride, palladium chloride and the like. Ordinarily, therefore, these catalysts will contain an amount of halogen, preferably chlorine, at least equal to the amount of platinum group metal. The alumina support may be prepared in a variety of ways by forming alpha alumina monohydrate or the alpha or beta alumina trihydrate or mixtures of two or more of these hydrates in any of the many known ways whereupon the hydrate is dried and calcined at about 1000°–1400° F. to render the alumina adsorptive. It is preferred to use an alumina of a high degree of purity, preferably as is obtainable by the hydrolysis of aluminum alcoholate.

Hydroforming of the naphtha is effected at temperatures of from about 850–1000° F., pressures of from about 50 to about 750 p.s.i.g. and at feed rates of from about 0.1 to about 5.0 volumes of liquid naphtha feed per volume of catalyst per hour. Hydrogen or recycle process gas rich in hydrogen is charged to the hydroforming reaction zone at a rate of from about 2000 to 10,000 s.c.f./bbl. of naphtha feed. While the hydroforming reaction zone can be operated as a fixed bed, moving bed or fluidized solids bed, it is ordinarily preferred to utilize fixed beds of catalyst in several vessels arranged in series with means for reheating the reaction mixture between vessels.

The present invention pertains to the operation of such a hydrofining-hydroforming combination process in a highly integrated system, i.e. one in which the feed to the hydrofiner is heated by indirect heat exchange with hydroformer product and in which the excess or make-gas from the hydroformer is used as the stripper gas and as the treat gas in the hydrofining step. Specifically, this invention is concerned with a method for placing such a combination system on stream and effectively activating the hydrofining catalyst even though hydrogen-rich treat gas is not immediately available for the hydroforming and/or the hydrofining step.

Reference is made to the accompanying drawing which illustrates, diagrammatically, a flow plan of an integrated hydrofining-hydroforming reaction system.

Naphtha feed is supplied to the system via inlet line 1 and is passed through feed-hydroformer product heat exchanger 2 and thence via line 3 to inlet line 4 to the hydrofiner 6. Hydrogen or hydrogen-containing treat gas is supplied via line 5 to inlet line 4 and thence to the hydrofiner. The hydrofiner is charged with the catalyst and is normally operated under the conditions disclosed above. The hydrofined product is withdrawn via line 7 and is cooled sufficiently to condense normally liquid products and transferred to separator drum 8. Excess treat gas and a major proportion of the hydrogen sulfide, ammonia etc. formed in the hydrofining treatment are taken overhead from the separator 8 via line 9 and, if desired, sulfur is recovered therefrom.

The liquid hydrofined product is removed from separator 8 via line 10 and supplied to the top of absorber stripper tower 11. Hydrogen or hydrogen rich gas is supplied via line 12 to the bottom of the tower 11 in order to countercurrently contact the liquid hydrofined product and strip off residual hydrogen sulfide which is removed overhead via line 13. Treat gas for charging to the hydrofiner is discharged from line 13 into line 5 and any excess is vented from the system via line 14. The upper part of stripper 11 is maintained at a relatively high temperature to facilitate stripping of gases and water from the naphtha, with suitable condensers, separators and reflux means, not shown, being provided to insure the removal of impurities and the avoidance of loss of liquid naphtha. The lower portion of the absorber-stripper 11 is operated at a somewhat lower temperature, for example about 150° F. and thus serves effectively to absorb $C_3$ and higher hydrocarbons from the hydrogen-rich stripping gas supplied through line 12.

The stripped, hydrofined naphtha containing the absorbed $C_3+$ hydrocarbons is withdrawn from absorber-stripper via line 15, heated in furnace 16 to or above hydroforming temperature and passed via line 17 to line 20 and thence into hydroformer 21. Hydrogen, obtained as described below is supplied via line 18, preheated in furnace 16 to temperatures above hydroforming temperatures and is then passed via line 19 to line 20 and thence to the hydroformer 21. The hydroformer is charged with the catalyst and is operated under the conditions described above to upgrade the naphtha to about a 95-98 or higher research clear octane number. The hydroformed product is withdrawn from the hydroformer 21 via line 22 and cooled in fresh feed-hydroformed product heat exchanger 2 and further cooled if necessary and passed via line 23 to product separator vessel 24. The normally liquid motor gasoline products are withdrawn via line 25 and passed to product finishing and storage. The normally gaseous products, principally hydrogen in admixture with lower molecular weight hydrocarbons, conveniently termed recycle gas is taken off overhead from separator 24 via line 26 and part of it at separator pressure is supplied to line 12 to furnish the stripping gas for the absorber-stripper and treat gas for the hydrofiner and the remainder is supplied via line 27 to recycle gas compressor 28 and thence to line 18 for supply to the hydroformer reactor 21 as described above.

The activity of the cobalt oxide-molybdenum oxide type catalysts used in hydrofiner 6 is largely dependent upon the initial catalyst pretreatment. Various methods of activating such catalysts have been disclosed in the literature and prior patents. It has, for example, been proposed to activate such catalysts by pretreatment with a sulfur containing feed stock or with hydrogen sulfide. It has been found that hydrofining catalyst activity can be greatly increased by the use of carbon disulfide as the activating agent. The superiority of carbon disulfide may be seen not only in the fact that the rate of activation therewith is considerably higher than is possible with hydrogen sulfide but also much higher catalyst activity levels are achieved with considerably smaller quantities of sulfur added.

The problem of catalyst activation for naphtha feed hydrofiners to platinum hydroformers in a combination system as described above is somewhat complicated. Because the platinum hydroformer and the naphtha feed hydrofiner are integrated, treat gas is not immediately available at start-up. Therefore, activation must be carried out after the hydrofiner has been on oil for some period of time since treat gas must be used in the activation. In addition, using high concentrations of sulfur compounds for activation will result in considerable hydrogen sulfide production. This hydrogen sulfide would have to be removed from the hydrofiner effluent before contacting the platinum-alumina catalyst in the hydroforming reaction zone. This would result in excessive costs since the size of the equipment would have to be considerably larger than is necessary to remove the hydrogen sulfide during the normal operating conditions. If the hydrogen sulfide is not removed, the sulfur levels are higher than desired for optimum hydroforming operations with platinum-alumina catalysts.

In an optimum cobalt oxide-molybdenum oxide catalyst activation in a pilot plant, feed naphtha containing 0.6 wt. percent carbon disulfide is introduced to the catalyst at 550° F., 250 p.s.i.g. with 500 s.c.f./b. of treat gas having normal (65-70%) hydrogen concentration. After 24 hours of activation, the catalyst has reached essentially full activity. Shorter activation times will result in correspondingly lower catalyst activity. However, this method of activation can not be applied to naphtha hydrofiners integrated with hydroformers employing platinum-alumina catalysts.

In accordance with the present invention, the hydrofiner catalyst can be activated to a high level of activity by the following procedure.

A dry inert gas such as natural gas, nitrogen or scrubbed flue gas is passed via line 15' into line 15 and through preheat furnace 16 and thence into the hydroformer 21 in order to gradually bring the catalyst up to reaction temperature of about 875-950° F.

Charge naphtha feed is withdrawn from crude distillation at about 300° F. and circulated through the hydrofiner and the absorber-stripper, but not through the hydroformer, and passes through line 12 and line 12' product-feed heat exchanger 2 and thence to stabilizing and storage equipment (not shown).

As the hydroformer approaches reaction temperature, the introduction of inert gas is stopped, the effluent from the hydrofiner and the absorber-stripper is then passed through line 15 and charged to the preheat furnace 16 and thence to the hydroformer 21. The charge naphtha to the hydrofiner is increased in temperature to about 550° F. because more heat is available in the product heat exchanger 2 when liquid product is present. Hydrogen-containing gas is produced in the hydroformer, separated from the normally liquid products in separator 24 and recycled to the hydroformer via lines 26, 27, compressor 28, line 18, preheater 16 and lines 19 and 20.

After about two hours of operation, sufficient hydrogen-rich recycle gas is available from the hydroforming reaction to charge the same via line 12 to the absorber stripper and thence via lines 13 and 5 to the hydrofiner 6. When recycle or treat gas is available for the hydrofiner, carbon disulfide is added to the naphtha feed in order to activate the hydrofining catalyst. Usually about 0.1 wt. percent of carbon disulfide based on the naphtha feed is added to the feed and is continued for about 120 hours. This procedure will give a catalyst activity about 80% of that obtained under the more ideal pilot plant optimum activation described above.

Catalyst activity can be increased by minimizing the time on oil prior to the introduction of the carbon disulfide. Using 0.6 wt. percent in place of 0.1 wt. percent carbon disulfide and contacting the hydrofiner catalyst with feed prior to carbon disulfide addition as described above will give about 90% of the catalyst activity obtained by the optimum pilot plant preactivation described above in the same period about 24 hours. However, since this amount of carbon disulfide produces an excessive amount of hydrogen sulfide, it is preferable to use the lower concentration of carbon disulfide and continue the treatment for the longer period of time. The total amount of sulfur added under these conditions corresponds to about 850 wt. percent of the stoichiometric quantity necessary for the conversion of the metal oxides on the catalyst to sulfides (CoS, $MoS_2$). Thus carbon disulfide concentrations and time of addition can be interchanged. The total amount of sulfur added for preactivation should be more than 100% and up to about 1500% of the stoichiometric quantity necessary to convert the cobalt oxide and molybdenum oxide to the corresponding sulfides. Lower alkyl mercaptans such as ethyl mercaptan and the like could also be used as the sulfiding agent in place of carbon disulfide. Preactivation of the catalyst with a high sulfur naphtha feed i.e. containing about 740 p.p.m. sulfur would require an activation of up to 250 hours to attain a lower level of activity than is attainable with carbon disulfide. During this time the hydrofiner effluent will contain a high concentration of sulfur compounds which will be deleterious to the hydroforming operation with platinum-alumina catalyst.

The following example is illustrative of the present invention.

Example

An integrated hydrofiner-hydroformer system is utilized to upgrade a Kuwait naphtha feed having a 170/400° F. boiling range based on ASTM distillation and containing 0.0765 wt. percent sulfur. The hydrofiner is charged with a cobalt molybdate on alumina catalyst containing 3.5% cobalt as CoO and 13% molybdena as $MoO_3$. The catalyst had a surface area of 260 m.$^2$/gm. and was in the form of ⅛″ extrudates. The hydroformer is charged with a catalyst comprising 0.6 wt. percent platinum upon eta alumina preferably derived from aluminum alcoholate having a surface area of about 200 m.$^2$/gm., and containing about 0.75% chlorine.

Dry natural gas is passed through the preheat furnace and thence through the hydroformer to bring it gradually up to reaction temperature of about 900° F. Charge naphtha from the crude distillation unit is charged at about 300° and a feed rate of 4 v./hr./v. to the hydrofiner maintained at a pressure of 250 p.s.i.g. The naphtha is withdrawn from the hydrofiner and passed through the absorber stripper and thence to stabilization and storage equipment. This first step or phase of the operation is continued for about 24 hours although it is advantageous, if possible, to shorten this period.

As the hydroformer approaches reaction temperature, the second step or phase of the activation is carried out. At this time, the temperature of the naphtha feed to the hydrofiner is increased to 550° F., the feed rate and hydrofiner pressure remaining the same as in step 1. The effluent from the hydrofiner at this time is passed through the product separator and the absorber stripper, and is then heated to reaction temperature and charged to the hydroformer. The reaction products are withdrawn from the hydroformer passed through the product feed heat exchanger and thence after further cooling passed to the liquid product separator. As hydrogen is produced in the hydroformer, it is recycled to the hydroformer to supply heat of reaction and minimize carbon formation. This second step or phase is continued for about three hours although it is also desirable to keep the duration of this second step as short as possible.

As soon as sufficient recycle or treat gas is available, the third step or phase of the activation operation is carried out consisting of charging hydrogen-rich gas (70% $H_2$) to the hydrofiner at a rate of 500 s.c.f./b. while maintaining the other conditions the same. The third step or phase is continued for about 8 hours at which time the catalyst shows an activity about 24% of that obtainable by optimum activation described above.

In the fourth step or phase conditions are maintained as in step 3 except that 0.12 wt. percent of carbon disulfide based upon naphtha feed is added to the naphtha charge entering the hydrofiner. The addition of carbon disulfide is continued for 120 hours at which time the catalyst activity is 65% as compared with 82% activity when using the optimum procedure. After this activation the hydrofiner product will contain about 6 p.p.m. sulfur when charging the above described Kuwait feed. At the same conditions as in step 4 but without $CS_2$ activation, product sulfur would be about 30 p.p.m. While the latter product is suitable for charging to the platinum hydroformer unit, the former product is much to be preferred.

The foregoing description contains a limited number of embodiments of the present invention. It will be understood that variations are possible without departing from the scope of the following claims.

What is claimed is:

1. In the start-up of a combination system of an integrated hydrofining reaction zone employing a cobalt oxide-molybdenum oxide on alumina catalyst and a hydroforming reaction zone employing a platinum group metal on alumina catalyst, wherein hydrogen is not available at the start-up and the hydrofining catalyst cannot be activated before hydrogen is available from the hydroforming reaction zone, the steps which comprise charging fresh naphtha feed at about 300° F. to the hydrofining reaction zone, circulating heated dry inert gas through the hydroforming reaction zone to gradually raise the temperature in said hydroforming zone to about 850° to 950° F. without passing the hydrofiner effluent through said hydroforming reaction zone, increasing the temperature of the naphtha feed charged to said hydrofining reaction zone to above about 550° F., then charging the hydrofiner effluent to said hydroforming reaction zone after said hydroforming reaction zone has reached hydroforming reaction temperature, separating and collecting hydrogen-containing gas from the effluent from said hydroforming reaction zone, recycling a portion of said collected hydrogen-containing gas to said hydroforming reaction zone, continuing the operation until sufficient hydrogen-containing gas is available for said hydrofining reaction zone, charging a portion of said collected hydrogen-containing gas to the said hydrofining reaction zone and thereafter activating the cobalt oxide-molybdenum oxide on alumina catalyst by adding a sulfiding agent to said naphtha feed to said hydrofining reaction zone to convert the catalytic metal compounds to the corresponding sulfides, while continuing to supply hydrogen-containing gas to said hydrofining reaction zone.

2. The process as defined in claim 1 in which the sulfiding agent is carbon disulfide.

3. The process as defined in claim 1 in which the sulfiding agent is carbon disulfide and is added in amounts of between 0.1 and 0.6 wt. percent based upon the naphtha feed.

4. The process as defined in claim 3 in which the total amount of sulfur added is from 100% to 1500% of the stoichiometric quantity necessary to convert the cobalt and molybdenum oxides to the corresponding sulfides.

5. In a process of hydrofining, the method of preactivating a hydrofining catalyst consisting essentially of cobalt and molybdenum oxides dispersed upon an alumina support by contacting the catalyst for an extended period with carbon disulfide at temperatures of about 300–600° F. in order to convert the cobalt and molybdenum oxides to sulfides.

6. The method as defined in claim 5 in which the total amount of sulfur added is from 100% to 1500% of the stoichiometric quantity necessary to convert the cobalt and molybdenum oxides to the corresponding sulfides.

References Cited in the file of this patent

UNITED STATES PATENTS

| | | |
|---|---|---|
| 2,511,453 | Barry | June 13, 1950 |
| 2,773,007 | Gerhold | Dec. 4, 1956 |
| 2,773,013 | Wolf et al. | Dec. 4, 1956 |
| 2,903,415 | Bowles | Sept. 8, 1959 |
| 2,914,470 | Johnson et al. | Nov. 24, 1959 |
| 2,943,999 | Moore et al. | July 5, 1960 |
| 2,953,519 | Bercik et al. | Sept. 20, 1960 |